US011044279B1

United States Patent
Benkreira et al.

(10) Patent No.: US 11,044,279 B1
(45) Date of Patent: Jun. 22, 2021

(54) SYSTEMS AND METHODS FOR SECURE BROWSER SESSION TRANSFER

(71) Applicant: Capital One Services, LLC, McLean, VA (US)

(72) Inventors: Abdelkader Benkreira, Washington, DC (US); George Bergeron, Falls Church, VA (US); Adam Vukich, Alexandria, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/721,659

(22) Filed: Dec. 19, 2019

(51) Int. Cl.
*G06F 15/16* (2006.01)
*H04L 29/06* (2006.01)
*H04W 36/00* (2009.01)
*H04L 29/08* (2006.01)
*G06F 16/955* (2019.01)

(52) U.S. Cl.
CPC ...... *H04L 65/1069* (2013.01); *G06F 16/9558* (2019.01); *H04L 69/329* (2013.01); *H04W 36/0016* (2013.01)

(58) Field of Classification Search
CPC ............. H04L 65/1069; H04L 69/329; H04W 36/0016; G06F 16/9558
USPC ........................................................ 709/228
See application file for complete search history.

(56) References Cited

U.S. PATENT DOCUMENTS

| 7,487,248 | B2 * | 2/2009 | Moran ..................... H04L 67/14 709/206 |
| 8,112,550 | B2 | 2/2012 | Wilson |
| 8,177,125 | B1 * | 5/2012 | Cooley .............. G06Q 30/0641 235/379 |
| 8,868,533 | B2 | 10/2014 | Powell et al. |
| 9,203,824 | B1 * | 12/2015 | Nunn ....................... H04L 63/08 |
| 9,225,711 | B1 * | 12/2015 | Sorensen ............ H04L 63/0815 |
| 9,948,729 | B1 * | 4/2018 | Ekambaram ............ G06F 3/147 |
| 10,110,684 | B1 * | 10/2018 | Haltore ................. H04L 67/148 |
| 10,474,728 | B2 * | 11/2019 | Batraski .............. H04L 67/1095 |
| 2003/0110266 | A1 * | 6/2003 | Rollins ................. H04L 67/142 709/227 |
| 2005/0027605 | A1 * | 2/2005 | Chen ..................... G06Q 30/06 705/26.8 |

(Continued)

OTHER PUBLICATIONS

Bursztein et al. "Sessionjuggler: Secure Web Login From an Untrusted Terminal Using Session Hijacking". Apr. 2012. IW3C2. pp. 1-10. (Year: 2012).*

*Primary Examiner* — Imad Hussain
(74) *Attorney, Agent, or Firm* — Hunton Andrews Kurth LLP

(57) ABSTRACT

Systems and methods for secure browser session transfer are provided. The system may include memory and one or more processors coupled to the memory. The one or more processors may be configured to establish a connection with an active web session of a first browser. The one or more processors may be configured to transfer, based on the established connection, the active web session to a second browser so as to preserve a first set of objects of the active web session of the first browser. The one or more processors may be configured to receive one or more parameters as a first input in the active web session of the second browser. The one or more processors may be configured to execute a plurality of actions in the active web session of the second browser that are responsive to the receipt of the first input.

20 Claims, 9 Drawing Sheets

(56) References Cited

U.S. PATENT DOCUMENTS

| | | | |
|---|---|---|---|
| 2005/0066037 A1* | 3/2005 | Song | G06F 16/95 709/227 |
| 2007/0054627 A1* | 3/2007 | Wormaid | G06F 9/4856 455/70 |
| 2008/0289029 A1* | 11/2008 | Kim | G06F 16/9577 726/12 |
| 2009/0138606 A1* | 5/2009 | Moran | H04L 67/14 709/227 |
| 2011/0275358 A1* | 11/2011 | Faenger | H04W 8/24 455/420 |
| 2012/0096069 A1* | 4/2012 | Chan | G06F 9/4856 709/203 |
| 2013/0080279 A1* | 3/2013 | Daily | G06Q 20/208 705/23 |
| 2013/0080525 A1* | 3/2013 | Aoki | G06F 9/4856 709/204 |
| 2014/0129435 A1* | 5/2014 | Pardo | G06Q 20/227 705/41 |
| 2015/0134518 A1* | 5/2015 | Turovsky | G06Q 20/12 705/41 |
| 2016/0094654 A1* | 3/2016 | Raman | H04W 4/60 715/733 |
| 2016/0125490 A1* | 5/2016 | Angal | G06Q 30/06 705/26.35 |
| 2016/0173617 A1* | 6/2016 | Allinson | H04L 67/02 709/227 |
| 2017/0054767 A1* | 2/2017 | Goldsmith | G06F 9/461 |
| 2017/0097973 A1* | 4/2017 | Iannaccone | H04L 67/1095 |
| 2017/0171285 A1* | 6/2017 | Shu | H04L 51/04 |
| 2018/0077244 A1* | 3/2018 | Thakkar | H04L 67/14 |
| 2018/0332124 A1* | 11/2018 | Haltore | H04L 61/103 |
| 2018/0373484 A1* | 12/2018 | Handrigan | G06F 3/1454 |
| 2019/0213583 A1* | 7/2019 | Romero | G06Q 20/38 |
| 2020/0402033 A1* | 12/2020 | Sivan | G06Q 20/3276 |

* cited by examiner

SYSTEMS AND METHODS FOR SECURE BROWSER SESSION TRANSFER

FIELD OF THE DISCLOSURE

The present disclosure relates to systems and methods for secure browser session transfer.

BACKGROUND OF THE DISCLOSURE

Current solutions for browser session transfers are limited to specific desktop browsers, which may be limited to detect potential pitfalls associated with web browsing capabilities. These and other deficiencies exist.

SUMMARY OF THE DISCLOSURE

Various embodiments of the present disclosure provide systems and methods for secure browser session transfer. In an exemplary embodiment, a system may include memory and one or more processors coupled to the memory. The one or more processors may be configured to establish a connection with an active web session of a first browser. The one or more processors may be configured to transfer, based on the established connection, the active web session to a second browser so as to preserve a first set of objects of the active web session of the first browser. The one or more processors may be configured to receive one or more parameters as a first input in the active web session of the second browser. The one or more processors may be configured to execute a plurality of actions in the active web session of the second browser that are responsive to the receipt of the first input.

In one example embodiment, a method may include establishing, by one or more processors coupled to memory, a connection with a webpage of a first browser. The method may include providing, by the one or more processors and based on establishing the connection, the webpage to a second browser so as to preserve contents of the webpage of the first browser. The method may include receiving, at the one or more processors, a plurality of parameters as input in the webpage of the second browser. The method may include activating, by the one or more processors, a plurality of actions in the webpage of the second browser that are responsive to the receipt of the input.

In one example embodiment, a computer-readable medium storing instructions that, when executed by at least one processor, cause the at least one processor to initiate a connection with a first web session of a first browser. Further, the computer-readable medium storing instructions that, when executed by the at least one processor, cause the at least one processor to transmit, to a second browser and based on the initiated connection, designated objects of the first web session of the first browser. Also, the computer-readable medium storing instructions that, when executed by the at least one processor, cause the at least one processor to create, in the second browser, a second web session that includes the designated objects. Moreover, the computer-readable medium storing instructions that, when executed by the at least one computer processor, cause the at least one computer processor to receive one or more parameters as input in the second web session of the second browser. The computer-readable medium storing instructions that, when executed by the at least one computer processor, cause the at least one computer processor to execute a plurality of actions in the second web session of the second browser that are responsive to the receipt of the input.

BRIEF DESCRIPTION OF THE DRAWINGS

Various embodiments of the present disclosure, together with further objects and advantages, may best be understood by reference to the following description taken in conjunction with the accompanying drawings, in the several figures of which like reference numerals identify like elements, and in which.

DETAILED DESCRIPTION

Figure 1A:
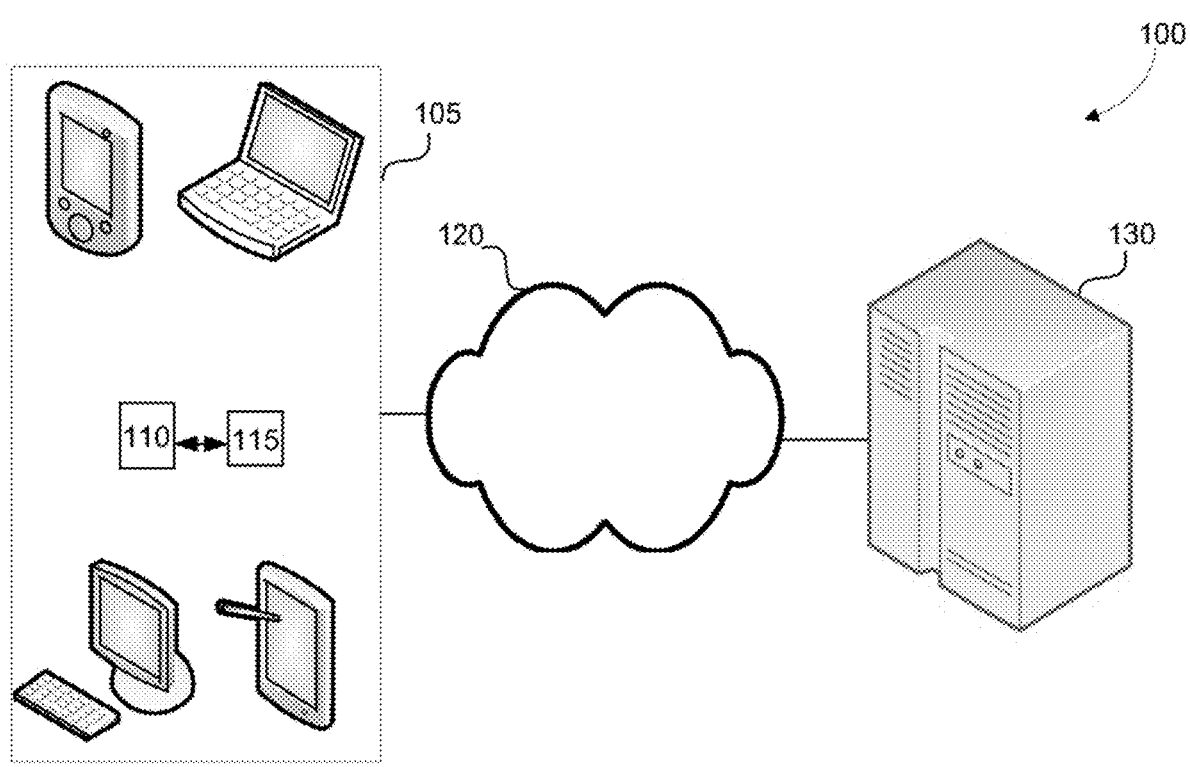
FIGS. 1A and 1B depict block diagrams of a system to transfer a browser session according to an example of the present disclosure.

The following description is intended to convey a thorough understanding of the embodiments described by providing a number of specific exemplary embodiments and details involving systems and methods for providing fraud control and prevention. It should be appreciated, however, that the present disclosure is not limited to these specific embodiments and details, which are exemplary only. It is further understood that one possessing ordinary skill in the art, in light of known systems and methods, would appreciate the use of the invention for its intended purposes and benefits in various embodiments, depending on specific design and other needs.

According to the various embodiments of the present disclosure, systems and methods use technical capabilities to provide secure browser session transfer to a mobile application for secure checkout. As disclosed herein, a user may browse and/or shop on a website, for example by connecting to a network such as the Internet, through a first web browser on a mobile device. The user may add one or more products to their shopping cart. At the time of checkout, the user may encounter a concern about the website due to one or more reasons, such as lack of trustworthiness and/or security risks. For example, one or more security risks may comprise browsing on an unsecured network (e.g. public WiFi) that may be susceptible to having web activity monitored. Based on these one or more concerns, the user may select, through the mobile device, an option from a menu that indicates it would like to share the present web session of the first browser to another web session or a webview of a second browser of the mobile application. As a consequence of the sharing, the uniform resource locator (URL) and the session are transferred to a webview of a second browser of the mobile application. This process is configured to allow the user to continue to shop as normal in the webview of the mobile application through the mobile device, with both the URL and session retained from the prior web session of the first browser. In some examples, the session may be transferred from one device to a second device. For example, the web session may be transferred from a mobile device to a laptop device browser with a browser extension. The mobile application may be configured to interact with specified webview document object model events in the second browser of the mobile application. For example, the webview of the second browser of the mobile application may be configured to display the URL and prior web session. The webview of the second browser may be configured to display a checkout page. One or more fields on the checkout page within the second browser of the mobile application may be automatically detected and a virtual credit card number may be configured to be automatically injected to proceed with further processing. For example, a credit card number and/or other payment methods (including Apple Pay, Google Wallet, PayPal, Bill Me Later) may be supplied in addition to automatically injecting the virtual credit card number. The one or more fields may also include loyalty points, such as airline loyalty points and/or codes, coupons, and billing fields, such as zip code, account holder name, phone number. In another example, if a user of the client device actively logs into the web session through one or more login credentials, for example by providing a username and/or password, such login credentials may be recorded and replayed or in the second web session. As further explained below, this particular technique results in reduced processing and greater security benefits.

Figure 1B:
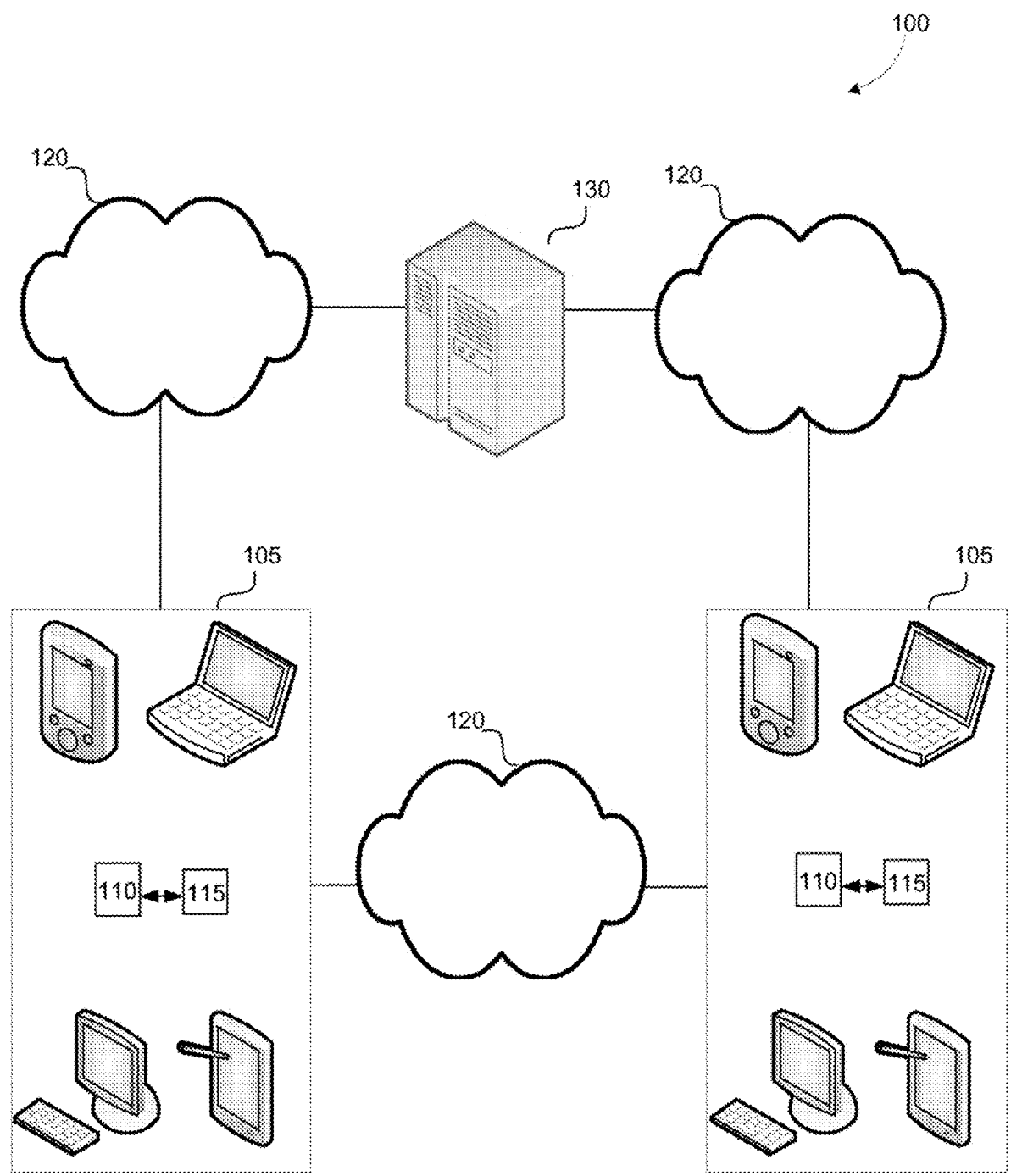

FIG. 1A illustrates a system 100 configured for secure browser session transfer according to an example of the present disclosure. As further discussed below, system 100 may include client device 105, network 120, and server 130. Although FIG. 1A illustrates single instances of the components, system 100 may include any number of components. For example, FIG. 1B illustrates system 100 that may include two client devices 105, network 120, and server 130. According to FIG. 1B, system 100 may reference same or similar components of system 100 of FIG. 1A. Although FIG. 1B illustrates two instances of client devices 105, system 100 may include any number of client devices.

As shown in FIG. 1A, client device 105, or end node 105, may be a network-enabled computer. As referred to herein, a network-enabled computer may include, but is not limited to: e.g., a computer device, or communications device including, e.g., a server, a network appliance, a personal computer (PC), a workstation, a mobile device, a phone, a handheld PC, a personal digital assistant (PDA), a thin client, a fat client, an Internet browser, or other device. Client device 105 also may be a mobile device; for example, a mobile device may include an iPhone, iPod, iPad from Apple® or any other mobile device running Apple's iOS operating system, any device running Google's Android® operating system, including for example, Google's wearable device, Google Glass, any device running Microsoft's Windows® Mobile operating system, and/or any other smartphone or like wearable mobile device.

In various examples according to the present disclosure, client device 105 of system 100 may execute one or more applications 110, such as software applications, that enable, for example, network communications with one or more components of system 100 and transmit and/or receive data. Client device 105 may include one or more browsers 115, such as mobile and/or mobile-based and/or desktop and/or desktop-based browsers, that are in communication with application 110.

Client device 105 may be in communication with one or more servers 130 via one or more networks 120, and may operate as a respective front-end to back-end pair with server 130. Client device 105 may transmit, for example from a mobile device application 110 executing on client device 105, one or more requests to server 130. The one or more requests may be associated with retrieving data from server 130. Server 130 may receive the one or more requests from client device 105. Based on the one or more requests from client device 105, server 130 may be configured to retrieve the requested data from one or more databases (not shown). Based on receipt of the requested data from the one or more databases, server 130 may be configured to transmit the received data to client device 105, the received data being responsive to one or more requests.

Server 130 may include one or more processors, which are coupled to memory. Server 130 may be configured as a central system, server or platform to control and call various data at different times to execute a plurality of workflow actions. Server 130 may be configured to connect to the one or more databases. Server 130 may be connected to at least one client device 105.

Network 120 may be one or more of a wireless network, a wired network or any combination of wireless network and wired network, and may be configured to connect client device 105 to server 130. For example, network 120 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g, Bluetooth network, or any other wired or wireless network for transmitting and receiving a data signal.

In addition, network 120 may include, without limitation, telephone lines, fiber optics, IEEE Ethernet 902.3, a wide area network ("WAN"), a wireless personal area network ("WPAN"), a local area network ("LAN"), or a global network such as the Internet. In addition, network 120 may support an Internet network, a wireless communication network, a cellular network, or the like, or any combination thereof. Network 120 may further include one network, or any number of the exemplary types of networks mentioned above, operating as a stand-alone network or in cooperation with each other. Network 120 may utilize one or more protocols of one or more network elements to which they are communicatively coupled. Network 120 may translate to or from other protocols to one or more protocols of network devices. Although network 120 is depicted as a single network, it should be appreciated that according to one or more examples, network 120 may comprise a plurality of interconnected networks, such as, for example, the Internet, a service provider's network, a cable television network, corporate networks, such as credit card association networks, and home networks.

For example, according to FIG. 1B, client devices 105 may be configured to transmit and/or receive data between each other through network 120. Client devices 105 may be in communication with server 130, as explained above with respect to FIG. 1A, and client devices 105 may transmit and/or receive data between each other through server 130. In addition, client devices 105 may be in direct communication with each other, via network 120, such that data sent between client devices 105 may not pass through server 130. Network 120 may be configured to provide data communication between a client device 105 and server 130 and between the client devices 105. For example, data may be communicated between client devices 105 and server 130 through the Internet or other network, and data may be communicated directly between client devices 105 without passing through server 130. Accordingly, network 120 may be one or more of the Internet, Near Field Communication (NFC), Radio Frequency Identification (RFID), Bluetooth, Wi-Fi, and/or the like. Client devices 105 may be same or different devices. For example, at least one of client device 105 may be a mobile device, and the other device 105 may be a mobile device. For example, at least one of client device 105 may be a mobile device, and the other device 105 may be a laptop or a desktop, or vice versa. Each client device 105 may include application 110 in communication with one or more browsers 115.

In this manner, a user of the mobile device may begin to browse and/or shop for one or more products through its corresponding browser of the mobile device. As further explained below, due to one or more identified concerns, that particular web session of the corresponding browser of the client device (e.g. a mobile device, a laptop, or a desktop) may be provided (or transmitted) (via application 110) to another browser of a second client device (e.g. a mobile device, a laptop, or a desktop) (via application 110) to continue to browse and/or shop for the one or more products. As a consequence, the user is provided with the benefits and capabilities to transfer its shopping cart, such as quantities and hyperlinks of one or more products, from a first browser of a first device to a second browser of a second device in a secure manner without having to re-add the one or more products and re-establish navigation of multiple pages for accessing and linking the one or more products. As discussed above, the first device may be the same or different as the second device.

Figure 2:
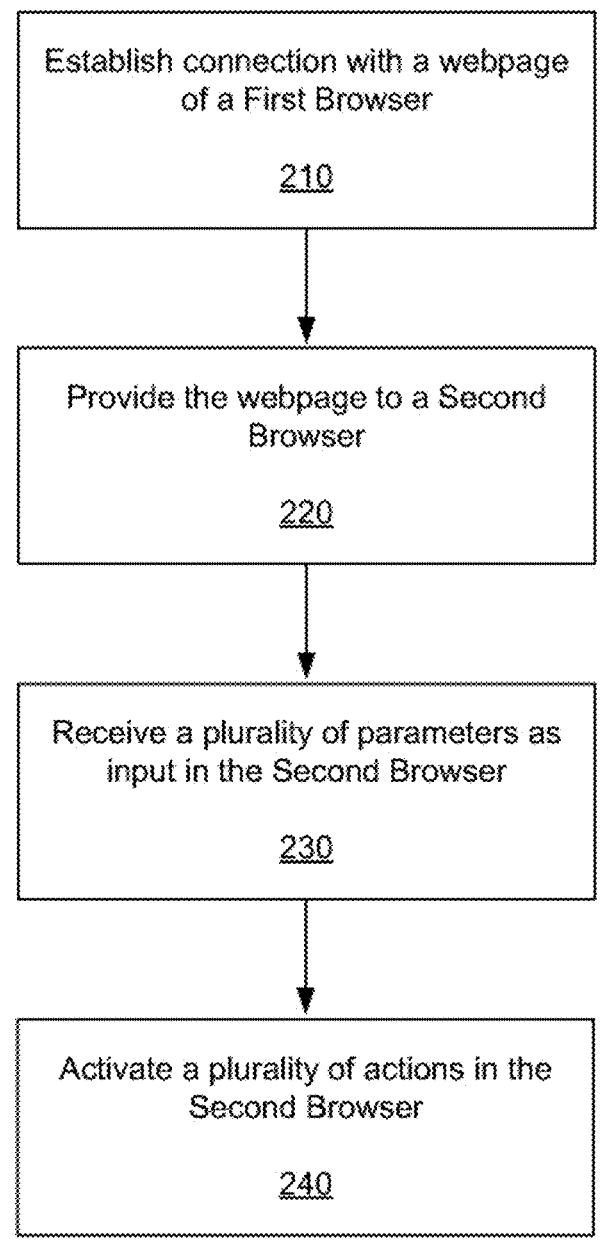
FIG. 2 depicts a flow diagram illustrating a method to transfer a browser session according to an example of the present disclosure.

FIG. 2 illustrates an example method 200 for secure browser session transfer. As explained below, method 200 may reference same or similar components of system 100.

At block 210, a connection may be established with a webpage of a first browser by a client device (similar to client device 105 as described above with respect to FIGS. 1A-1B), using a network (similar to network 120 as described above with respect to FIGS. 1A-1B). A user of the client device may browse and/or shop on a website. The user of the client device may add one or more products to their shopping cart. At the time of checkout, the user may encounter a concern about the website due to one or more reasons, such as lack of trustworthiness and/or security measures. Accordingly, the user of the client device may not decide to proceed with checkout of the one or more products from their shopping cart for completing a purchase and/or processing payment. Thus, the user of the client device may decide to browse and/or shop in a different browser, such as a second browser within a mobile application.

At block 220, the webpage of the first browser may be provided to a second browser (similar to mobile browser 115 as described above with respect to FIGS. 1A-1B) via mobile application (similar to mobile application 110 as described above with respect to FIGS. 1A-1B). For example, after a connection has been established as in block 210, the session may be transferred from a first browser, such as Chrome, Firefox, or Safari, to a second browser of a mobile application. The session may be transferred from the first browser to a second browser, such as a lightweight mobile browser, within the mobile application. In some examples, a notification, such as a pop-up message, may be activated to alert the client device that the active session of the webpage of the first browser is shareable, such as through a banner. The banner may be configured to be displayed as part of the checkout page. Alternatively, a share button may be accessible via a menu option. The active session may be autodetected which then populates the notification. For example, one or more scripts may be injected into the first browser that is configured to monitor the domain of the active session and check if it exists in a whitelist. The whitelist may be populated with known checkout or cart URLs. In some examples, the one or more scripts may be injected by the browsers' extension capability which allows document object model data to be monitored and react and/or respond to changes thereto and one or more actions of the user. For example, one action may comprise an event indicative of the user clicking or otherwise activating a button, such as a checkout button.

According to the present disclosure, when the client device is configured to display one or more products on the checkout page which is shared to webview or second browser of the mobile application, specified document object model (DOM) data or contents of the webpage may be captured. In this manner, the mobile application may be configured to capture DOM data so as to replicate or clone the active web session of the first browser. Specifically, the captured DOM data may include what events have already been created, not what the web session is currently performing. For example, DOM data may comprise a first set of objects of the active web session, which may include a plurality of hyperlinks and quantities of corresponding products, and a snapshot of the day/time that the one or more products are placed in the cart to enable a more secure checkout. For example, one or more additional product variants may be captured, including flight information (e.g. dates, times and/or destinations, etc.); concert information (e.g. seating preference); clothing (e.g. size, color, and/or quantity). In some examples, the first set of objects may be utilized to generate a template of the checkout page. In certain embodiments, only one or more hyperlinks to a corresponding product(s) and one or more quantities of the corresponding products are passed and/or transmitted to the webview of the second browser within the mobile application of the client device. For example, the active web session may be autodetected which then populates the notification. As another example, one or more scripts may be injected into the first browser that is configured to monitor the domain of the active session and check if it exists in a whitelist. The whitelist may be populated with known checkout or cart URLs. In some examples, DOM data that may be captured may comprise one or more fields, for example special instruction fields, such as instructions associated with conditions placed on ordering food, or indicating that an item is a gift prior checkout.

Upon providing the active web session of the first browser and based on the captured DOM data, a new session in a new web browser may be opened within the mobile application, which may be configured to allow for navigation to a desired page, such as a desired product page or checkout page. Alternatively and/or additionally, web automation techniques may be used to open all linked products in the second browser of the mobile application that were present in the first browser. Thus, the active web session of the first browser may be cloned. As used herein, "cloned" may refer to when the share button is clicked or otherwise activated in the mobile application. For example, one or more web automation techniques may comprise using JavaScript to replay the adding of the one or more items to the cart by programmatically clicking or otherwise activating a button associated with this action, changing the quantity, choosing a color, etc. so as to clone the active web session of the first browser.

At block 230, a plurality of parameters may be received as input in the second browser. For example, after the session is transferred from the first browser to the second browser, such as block 220, the user of the client device may continue to proceed to browse and/or shop for one or more products within the second browser of the mobile application. Once the one or more products are ready for checkout within the second browser of the mobile application, certain credentials may be provided in one or more payment fields. For example, one or more authenticated identification codes, such as virtual card number, expiration date, and card verification value, may be automatically provided. As a consequence, this helps accelerate checkout by the automatic injection of these values. For example, the user of the client device is no longer required to, for example, navigate additional screens or pages to re-add one or more products to their cart by entering a URL, visiting a URL, searching for a product, identifying a link corresponding to the product, thereby resulting in a more efficient and reduced processing technique of providing and/or displaying data. Also, no longer is the user of the client device required to, for example, navigate additional screens or pages to log into a mobile banking application, obtain a virtual credit card number, wait to receive the virtual credit card number, and enter the virtual credit card number, thereby resulting in a more efficient and reduced processing technique of providing and/or displaying data. Moreover, security benefits are provided as a result of automatically populating the corresponding fields belonging to one or more authenticated identification codes, such as virtual credit card number and expiration date and card verification value. For example, a credit card number and/or other payment methods (including Apple Pay, Google Wallet, PayPal, Bill Me Later) may be supplied in addition to automatically injecting the virtual credit card number. The one or more fields may also include loyalty points, such as airline loyalty points and/or codes, coupons, and billing fields, such as zip code, account holder name, phone number.

For example, the one or more authenticated identification codes may include one or more tokens that is a data element associated with an account. In certain embodiments, one or more tokens, such as payment tokens may be configured to provide additional information that may be used by one or more systems to perform one or more operations consistent with disclosed embodiments. The one or more payment tokens consistent with the disclosed embodiments may be formatted in various ways. For example, a payment token may match the format of original sensitive data. In certain embodiments, payment tokens may be configured in such a way that they can be used for payment transactions for certain merchant(s), with certain digital wallet(s), certain mobile device(s), for certain user(s), in certain location(s), for certain product(s) or service(s) (e.g., linked to certain SKUs, etc.), with certain temporal restrictions (e.g., available for use for certain time periods, refreshable, nonrefreshable, etc.) and the like. The disclosed embodiments may execute software instructions that perform processes for generating, storing, processing, decoding, coding, transmitting, and/or receiving payment token(s) in certain formats with certain characteristics (e.g., associated with certain user(s), time restrictions, product restrictions, merchant restrictions, etc.).

At block 240, a plurality of actions may be activated in the second browser. For example, based on the received input from block 230, checkout may proceed to purchase and process payment for the one or more products. A credit card number and/or other payment methods (including Apple Pay, Google Wallet, PayPal, Bill Me Later) may be supplied in addition to automatically injecting the virtual credit card number. The one or more fields may also include loyalty points, such as airline loyalty points and/or codes, coupons, and billing fields, such as zip code, account holder name, phone number to process payment for the one or more products.

Figure 3A:
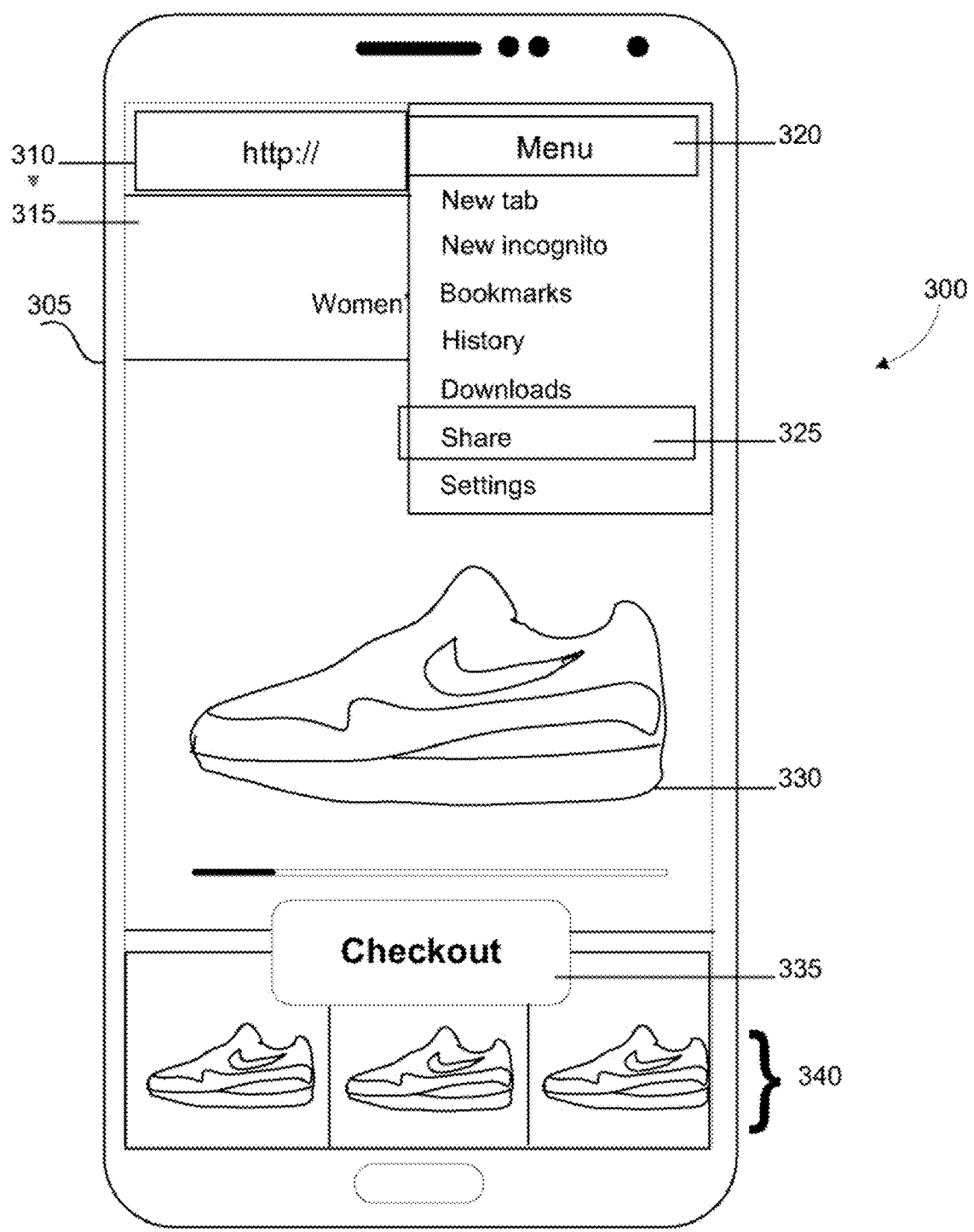
FIGS. 3A-3D depict display diagrams illustrating transfer and navigation of a browser session to a mobile application according to an example of the present disclosure.

FIG. 3A illustrates a display diagram 300 depicting transfer and navigation of a browser session to a mobile application according to an example of the present disclosure. For example, client device 305 may be shown (similar to client device 105 as described above with respect to FIGS. 1A-1B). Client device 305 may include URL address 310, display view 315, menu option 320, share option 325, product 330, checkout button 335, and one or more products 340. Display view 315 may comprise a first browser. Although URL address 310 only shows a portion of the address, it is understood that URL address 310 may include any full URL address, such as an address for an online merchant selling a product or service. URL address 310 may be displayed on a portion of display view 315. Menu option 320 may displayed on a portion of display view 315. Share option 325 may displayed on a portion of display view 315. Product 330 may displayed on a portion of display view 315. Checkout button 335 may displayed on a portion of display view 315. One or more products 340 may displayed on a portion of display view 315.

According to an example of the present disclosure, a user of client device 305 may be browsing or shopping using a first browser, such as Google Chrome. After reaching a page indicating checkout 335, and/or after one or more products 340 have been added to a cart, the user of client device 305 may switch over to a different browser in the mobile application (similar to application 110 as described above with respect to FIGS. 1A-1B) based on one or more concerns (as explained above). For example, user of client device 305 may click on menu option 320 which may be configured to enable sharing of the first browser via share option 325 that includes checkout button 335. Alternatively and/or additionally, menu option 320 may be configured to enable sharing of the first browser via share option 325 that includes checkout button 335 by the performance of a hovering process over menu option 320. In other words, it is not necessary that user of client device 305 perform a click button on menu option 320 to display and enable share option 325.

Checkout button 335 may be included as part of the first browser. One or more products 340 may comprise product 330. Product 330 may be selected and configured to illustrate an enlarged display of one or more products 340. One or more products 340 may comprise similar or different products, such as similarly shaped shoes and/or different shoe designs and/or different colors, in comparison to product 330. One or more products 340 may be linked, such as hyperlinked, to corresponding websites of each product.

Figure 3B:
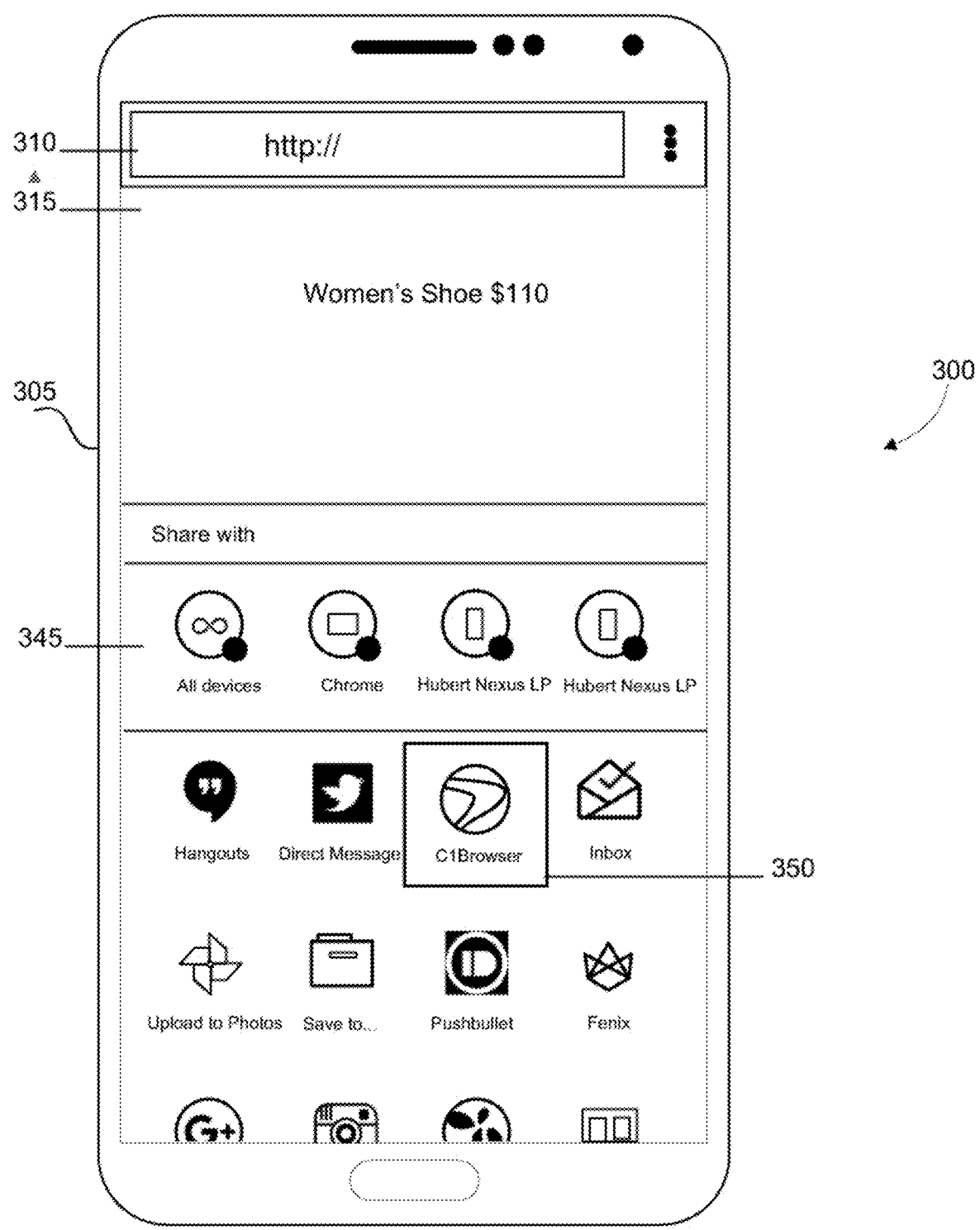

FIG. 3B illustrates a display diagram 300 depicting transfer and navigation of a browser session to a mobile application according to an example of the present disclosure. For example, client device 305 may be shown (similar to client device 105 as described above with respect to FIGS. 1A-1B). Client device 305 may include URL address 310, display view 315, menu option 320, share option 325, share options 345, and browser 350. Referring back to FIG. 3A, responsive to user of client device 305 clicking on menu option 320 or hovers or menu option 320 to configure sharing via share option 325, user of client device 305 may be taken to a display indicating which application to switch over to a different browser 350 in the mobile application (similar to application 110 as described above with respect to FIGS. 1A-1B).

Figure 3C:
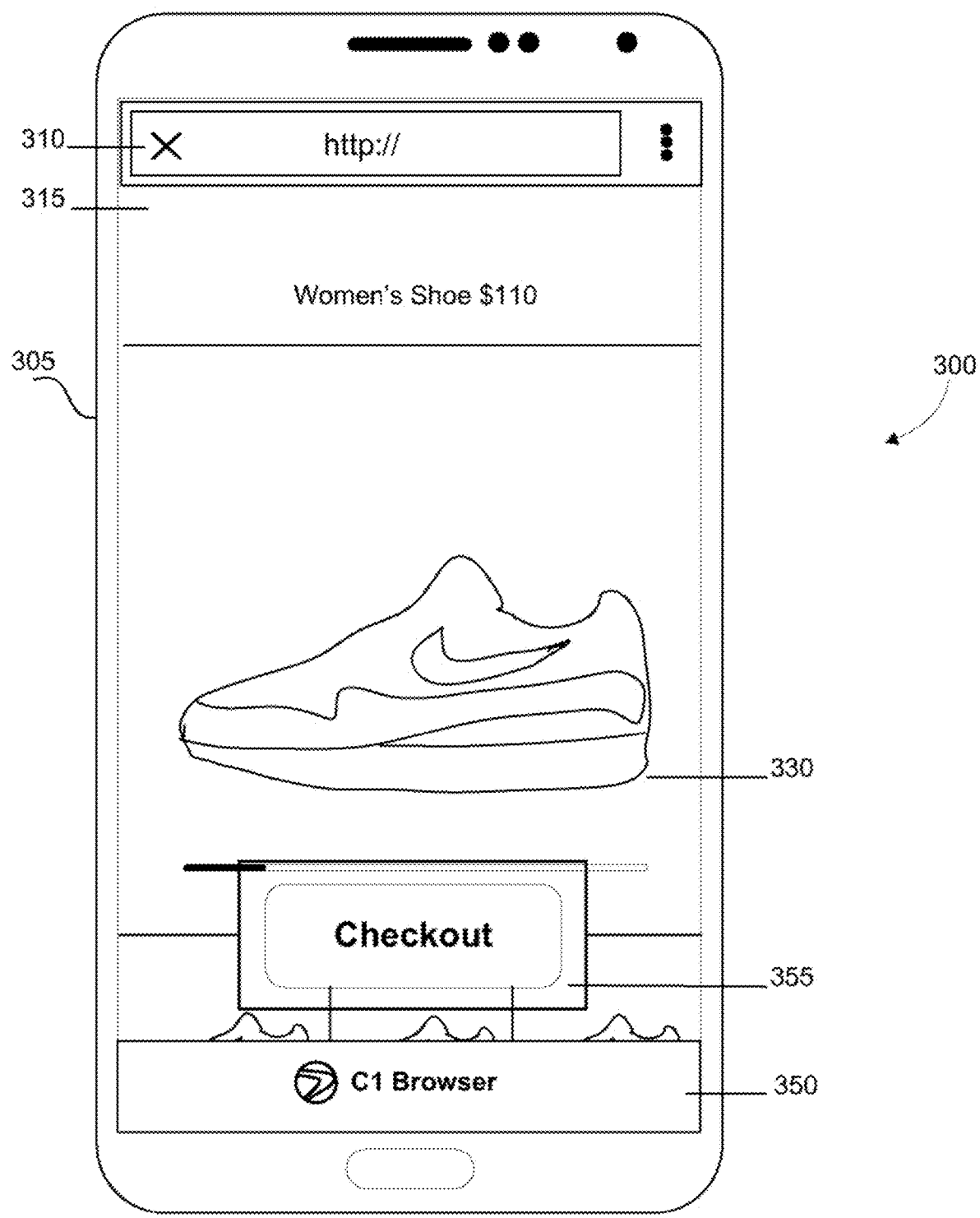

FIG. 3C illustrates a display diagram 300 depicting transfer and navigation of a browser session to a mobile application according to an example of the present disclosure. For example, client device 305 may be shown (similar to client device 105 as described above with respect to FIGS. 1A-1B). Client device 305 may include URL address 310, display view 315, product 330, checkout button 355, and browser 350. Referring back to FIG. 3B, responsive to user of client device 305 switching over to a different browser 350 in the mobile application, a new browser is opened with the same or similar view as of that view belonging to the first browser, such as the display or view of the first browser in FIG. 3A. For example, this second browser, or new browser, may be opened in mobile application (similar to mobile application 110 as described above with respect to FIGS. 1A-1B), such as in a webview of the mobile application. In this manner, the session of the first browser is preserved. For example, if user of client device 305 had included one or more products in their cart from the one or more websites, it would not be necessary for user of client device 305 to start over and begin adding the one or more products to their cart. As a consequence, user of client device 305 is no longer required to, for example, navigate additional screens or pages to re-add one or more products to their cart by entering a URL, visiting a URL, searching for a product, identifying a link corresponding to the product, thereby resulting in a more efficient and reduced processing technique of providing and/or displaying data. For example, as further illustrated in FIG. 3C, URL address 310 and product 330 are preserved, similar to that of URL address 310 and product 330 of FIG. 3A.

Figure 3D:
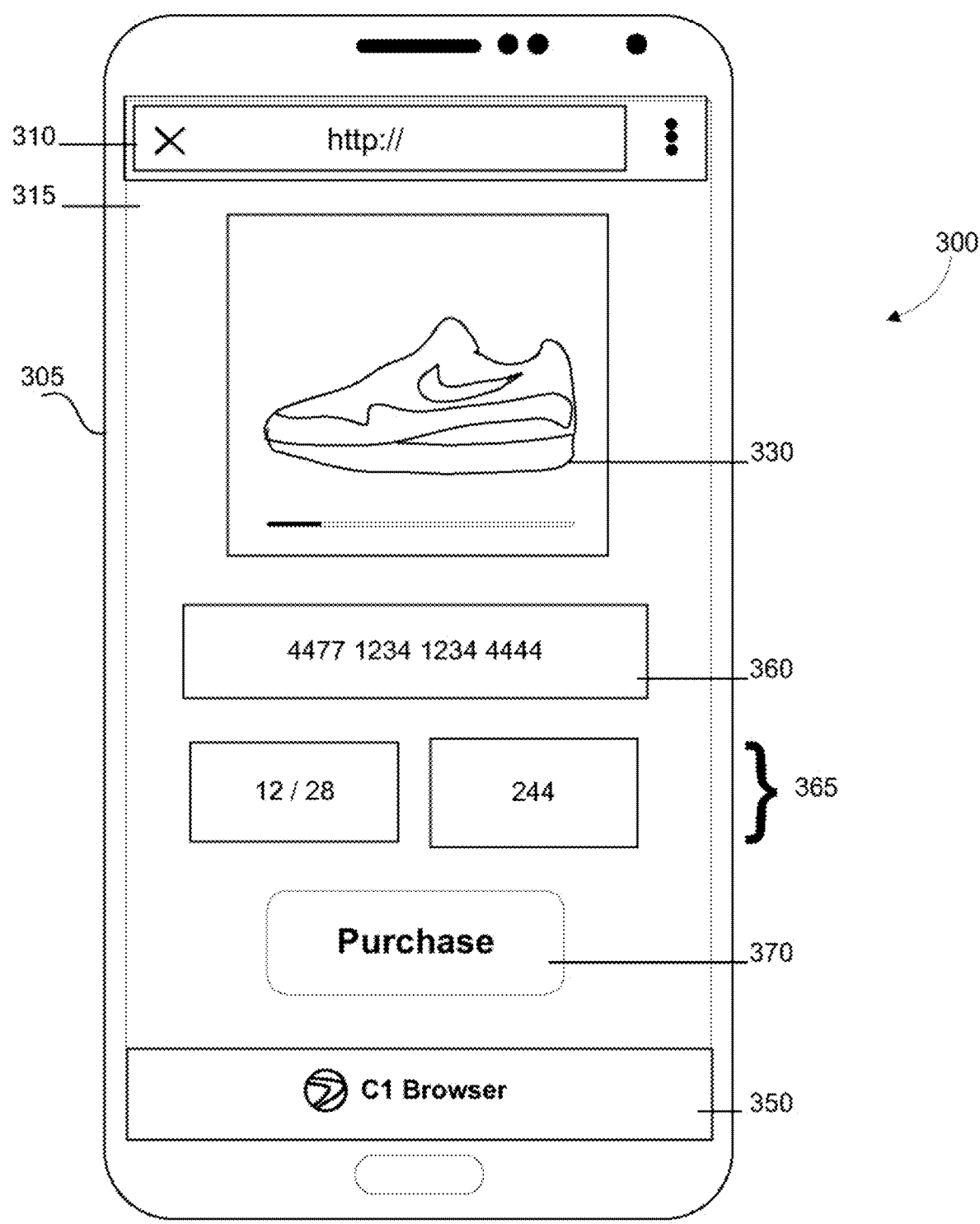

FIG. 3D illustrates a display diagram 300 depicting transfer and navigation of a browser session to a mobile application according to an example of the present disclosure. For example, client device 305 may be shown (similar to client device 105 as described above with respect to FIGS. 1A-1B). Client device 305 may include URL address 310, display view 315, product 330, virtual card number 360, expiration date and card verification value 365, purchase button 370, and browser 350. Referring back to FIG. 3C, once user of client device 305, now operating in browser 350 of mobile application, is in a position to checkout one or more products 330 for processing payment after clicking checkout button 335, at least one or more of authenticated identification codes, such as virtual card number 360 and expiration date and card verification value 365 fields may be automatically populated or inserted by mobile application (similar to mobile application 110 as described above with respect to FIGS. 1A-1B). As a consequence, user of client device 305 is no longer required to, for example, navigate additional screens or pages to log into a mobile banking application, obtain a virtual credit card number, wait to receive the virtual credit card number, and enter the virtual credit card number, thereby resulting in a more efficient and reduced processing technique of providing and/or displaying data. Moreover, security benefits are provided as a result of automatically populating the corresponding fields with one or more authenticated identification codes belonging to virtual credit card number 360 and expiration date and card verification value 365.

Figure 4A:
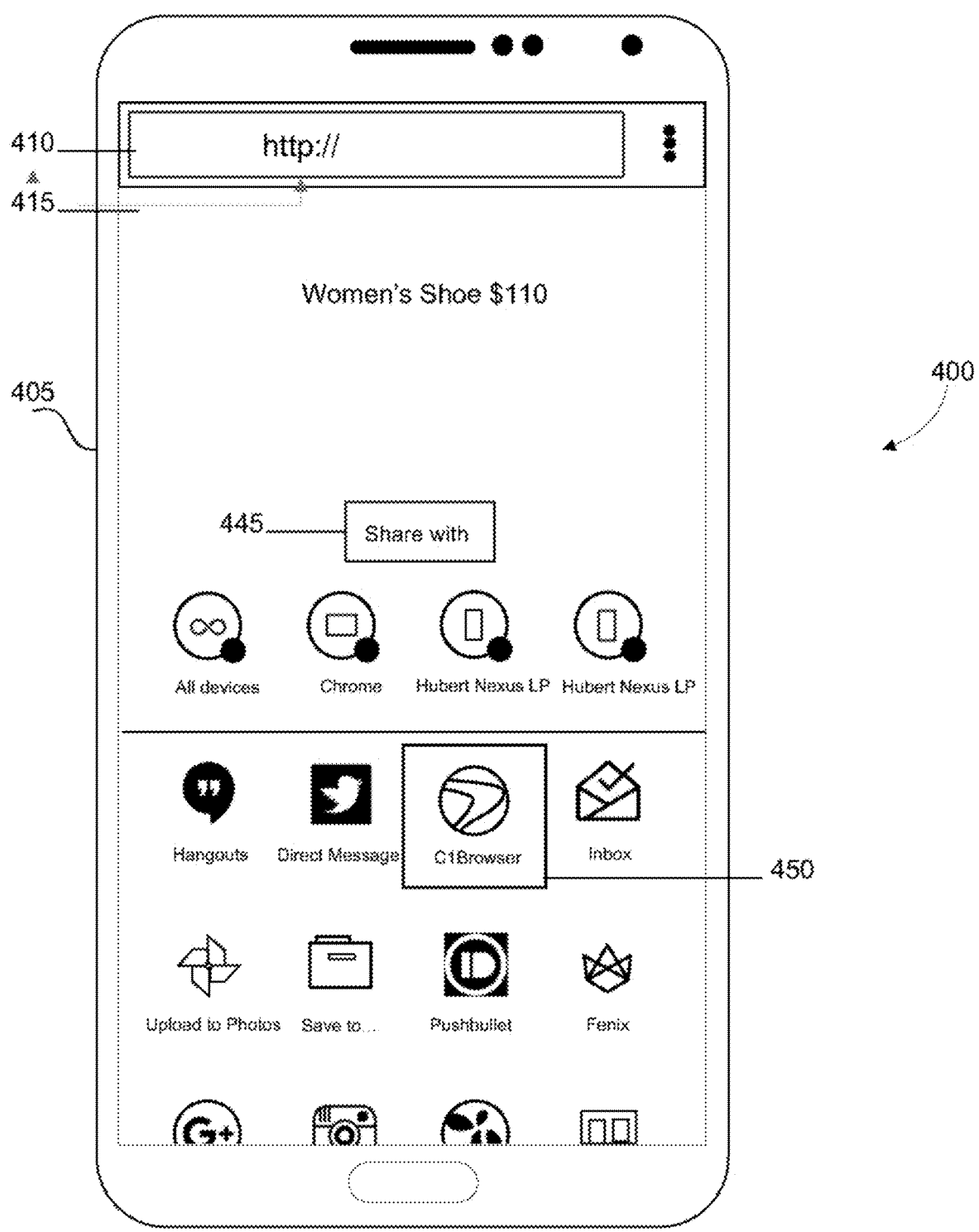
FIGS. 4A-4B depict display diagrams illustrating transfer and navigation of a browser session according to an example of the present disclosure.

FIG. 4A depicts a display diagram 400 illustrating transfer and navigation of a browser session according to an example of the present disclosure. For example, client device 405 may be shown (similar to client device 105 as described above with respect to FIGS. 1A-1B). Client device 405 may include URL address 410, display view 415, banner 445, and browser 450. Although URL address 410 only shows a portion of the address, it is understood that URL address 410 may include any full URL address, such as an address for an online merchant selling a product or service. A notification, such as a pop-up message, may be activated to alert the client device 405 that the active session of the webpage of the first browser of client device 405 is shareable, such as through a banner 445, through browser 450. Banner 445 may be configured to be displayed as part of the checkout page. Banner 445 may appear in any portion of client device 405, for example, such as in a center or middle portion of client device 405.

Figure 4B:
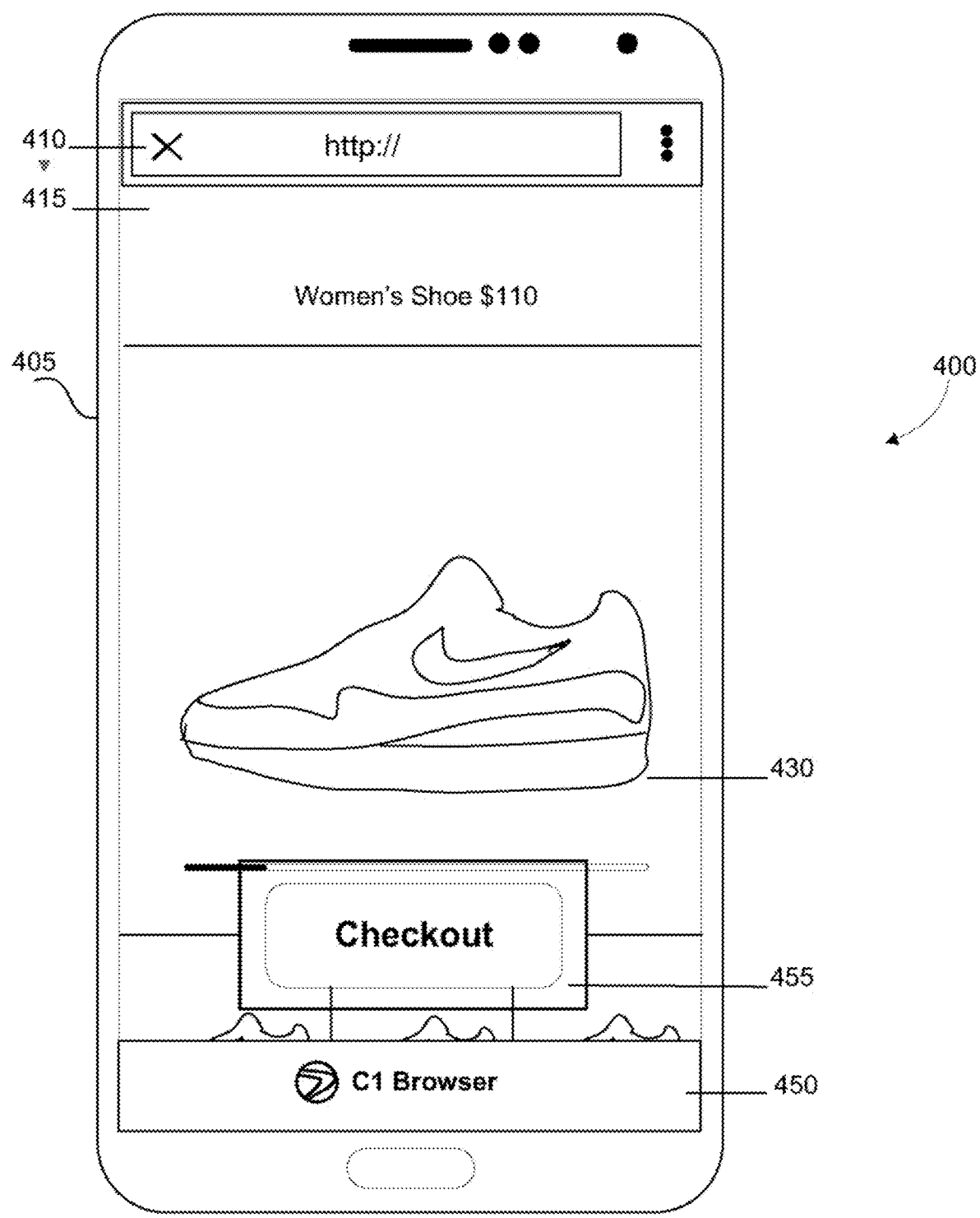

FIG. 4B depicts a display diagram 400 illustrating transfer and navigation of a browser session according to an example of the present disclosure. For example, client device 405 may be shown (similar to client device 105 as described above with respect to FIGS. 1A-1B). Client device 405 may include URL address 410, display view 415, product 430, checkout button 455, and browser 450. Although URL address 410 only shows a portion of the address, it is understood that URL address 410 may include any full URL address, such as an address for an online merchant selling a product or service. Referring back to FIG. 4A, responsive to user of client device 305 switching over to a different browser 350 in the mobile application by clicking on banner 445, a new browser is opened with the same or similar view as of that view belonging to the first browser, such as the display or view of the first browser in FIG. 4A. Thus, banner 445 may be configured to share the session of a first browser to a second browser. Banner 445 may disappear after it has been clicked to share the session of a first browser to a second browser. For example, this second browser 450, or new browser, may be opened in mobile application (similar to mobile application 110 as described above with respect to FIGS. 1A-1B), such as in a webview of the mobile application. In this manner, the session of the first browser is preserved. For example, if user of client device 405 were previously logged into one or more websites and/or user of client device 405 had included one or more products in their cart from the one or more websites, it would not be necessary for user of client device 405 to start over and begin adding the one or more products to their cart. As a consequence, user of client device 405 is no longer required to, for example, navigate additional screens or pages to re-add one or more products to their cart by entering a URL, visiting a URL, searching for a product, identifying a link corresponding to the product, thereby resulting in a more efficient and reduced processing technique of providing and/or displaying data. For example, as further illustrated in FIG. 4B, URL address 410 and product 430 are preserved.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

In the preceding specification, various embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

We claim:

1. A system comprising:
memory; and
one or more processors, coupled to the memory, configured to:
establish a connection with an active web session of a first browser;
transfer, based on the established connection and determination of one or more identified security risk factors, the active web session to a second browser so as to preserve a first set of objects of the active web session of the first browser, wherein at least one of the identified security risk factors is based on an initial browsing environment of the active web session, the initial browsing environment comprising an unsecured public network;
receive one or more parameters as a first input in the active web session of the second browser, the one or more parameters comprising a virtual card number; and
execute a plurality of actions in the active web session of the second browser that are responsive to the receipt of the first input.

2. The system of claim 1, wherein the first set of objects of the active web session comprises a plurality of hyperlinks and quantities of corresponding products.

3. The system of claim 1, wherein the transfer comprises a cloning procedure that reconstructs a display of the active web session of the first browser by passing a template including a plurality of hyperlinks and quantities of corresponding products.

4. The system of claim 1, wherein the active web session is transferred from the first browser on a first device to the second browser on a second device via a mobile application.

5. The system of claim 4, wherein the first device communicates directly with the second device.

6. The system of claim 1, wherein the active web session comprises a checkout page that includes a banner so as to transfer the active web session to the second browser.

7. The system of claim 1, wherein the receipt of the one or more parameters comprises receipt of an authorized virtual identification code as the first input to execute at least some of the plurality of actions in the active web session of the second browser.

8. The system of claim 1, wherein the second browser comprises a mobile-based browser.

9. The system of claim 1, wherein specified document object model events of the active web session of the first web browser are analyzed and parsed which are then transferred to the active web session to the second browser.

10. A method comprising:
establishing, by one or more processors coupled to memory, a connection with a webpage of a first browser;
providing, by the one or more processors and based on establishing the connection and determination of one or more identified security risk factors, the webpage to a second browser so as to preserve contents of the webpage of the first browser, wherein at least one of the identified security risk factors is based on an initial browsing environment of the webpage of the first browser, the initial browsing environment comprising an unsecured public network;
receiving, at the one or more processors, a plurality of parameters as input in the webpage of the second browser, the plurality of parameters comprising a virtual card number; and
activating, by the one or more processors, a plurality of actions in the webpage of the second browser that are responsive to the receipt of the input.

11. The method of claim 10, wherein the contents of the webpage comprises a plurality of hyperlinks and quantities of corresponding products.

12. The method of claim 10, wherein providing the webpage to the second browser comprises reconstructing a display of the webpage of the first browser by transmitting a plurality of hyperlinks and quantities of corresponding products.

13. The method of claim 10, wherein the webpage is provided to at least one of a light-weight mobile browser via a mobile application, and an installed browser application, browser extension, or browser add-on.

14. The method of claim 10, wherein the webpage comprises a checkout page that includes a banner so as to provide the webpage to the second browser.

15. The method of claim 10, wherein the receipt of the plurality of parameters comprises receipt of an authenticated identification code as the input to activate the plurality of actions in the webpage of the second browser.

16. The method of claim 10, wherein the first browser comprises at least one of a desktop-based browser and a mobile-based browser.

17. The method of claim 10, wherein the second browser comprises a mobile-based browser.

18. The method of claim 10, wherein specified document object model events of the webpage of the first web browser are analyzed and parsed which are then provided to the webpage of the second browser.

19. The method of claim 10, wherein one or more web automation techniques are deployed to open all linked products in the second browser of a mobile application that were present in the first browser.

20. A computer-readable non-transitory medium comprising computer-executable instructions that, when executed by at least one processor, perform procedures comprising the steps of:
- initiate a connection with a first web session of a first browser;
- transmit, to a second browser and based on the initiated connection and determination of one or more identified security risk factors, designated objects of the first web session of the first browser, wherein at least one of the identified security risk factors is based on an initial browsing environment of the first web session, the initial browsing environment comprising an unsecured public network;
- create, in the second browser, a second web session that includes the designated objects;
- receive one or more parameters as input in the second web session of the second browser, the one or more parameters comprising a virtual card number; and
- execute a plurality of actions in the second web session of the second browser that are responsive to the receipt of the input.

* * * * *